United States Patent
Beier

(10) Patent No.: US 7,541,912 B2
(45) Date of Patent: Jun. 2, 2009

(54) COMMUNICATIONS SYSTEM FOR REGISTERING TOLLS

(75) Inventor: Wolfgang Beier, Weil der Stadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/127,891

(22) Filed: May 12, 2005

(65) Prior Publication Data

US 2005/0253736 A1 Nov. 17, 2005

(30) Foreign Application Priority Data

May 14, 2004 (DE) .................. 10 2004 024 421
Aug. 2, 2004 (DE) .................. 10 2004 037 447

(51) Int. Cl.
*G05B 19/00* (2006.01)

(52) U.S. Cl. .................. 340/5.4; 705/13; 380/277; 380/282

(58) Field of Classification Search .................. 340/928, 340/5.61, 5.4, 5.42, 5.6; 705/13, 56–79; 235/384; 380/270–279, 282; 713/151–159
See application file for complete search history.

(56) References Cited

U.S. PATENT DOCUMENTS

| 6,088,717 A | 7/2000 | Reed et al. |
| 2005/0125669 A1* | 6/2005 | Stewart et al. .............. 713/171 |

FOREIGN PATENT DOCUMENTS

| DE | 101 04 499 | 8/2002 |
| DE | 699 04 952 T2 | 11/2003 |
| EP | 0 780 801 A1 | 6/1997 |
| EP | 0 998 073 A2 | 5/2000 |
| EP | 1 110 184 B1 | 1/2003 |
| JP | 11-232504 | 8/1999 |
| JP | 2002-109586 | 4/2002 |

OTHER PUBLICATIONS

Schneier, B.: "Applied Cryptography," 1996, Applied Cryptography. Protocols, Algorithms, and Source Code in C, New York, John Wiley & Sons, pp. 183-187.
Office Action of Jan. 23, 2008 from Japanese Patent Office for related JP application JP 2005-141673 with English translation.

* cited by examiner

*Primary Examiner*—Jeff Hofsass
*Assistant Examiner*—Hongmin Fan
(74) *Attorney, Agent, or Firm*—Davidson, Davidson & Kappel, LLC

(57) ABSTRACT

A communications system for registering tolls, with vehicles which have communications devices for wirefree communication between the vehicles and the toll operator which is assigned to them and has a corresponding communications device. In this context, the vehicles transmit toll information relevant to the toll operator in a toll-registration area which is assigned to the toll operator, and the toll operator determines or bills the tolls to be charged therefrom. If the vehicles communicate, by means of their communication devices, with other toll operators outside the toll registration area of the toll operator assigned to them, in order to register tolls, the exchange of toll-related information takes place only when a certificate of the assigned toll operator is successfully transmitted and on the basis of a public key or a private key.

8 Claims, 1 Drawing Sheet

COMMUNICATIONS SYSTEM FOR REGISTERING TOLLS

Priority is claimed to German Patent Application No. DE 10 2004 024 421.9, filed on May 14, 2004, and to German Patent Application No. DE 10 2004 037 447.3, filed on Aug. 2, 2004. The entire disclosure of both documents is incorporated by reference herein.

The present invention relates to a communications system for registering tolls.

BACKGROUND

Until now, toll concepts have been known in which in each case a toll operator is assigned a single toll registration region and said toll operator bills the tolls in accordance with the traffic volume entering this area, directly with the toll operator.

If a plurality of operators of toll systems accept each other's vehicles or vehicle devices in order to bill the toll in their own respective region, the demands placed on the means for protecting the entire system against fraud and the demands placed on all those involved become complex.

In the field of banking, such a complex structure and demands have been dealt with in Europe by selecting a key management system which is hierarchical. The European Central Bank has a main key whose public part is known to all, and each hierarchical layer below it has its key confirmed by the European Central Bank and this occurs correspondingly in the layers below that. As a result any bank can check the public key of any other bank if this bank firstly trusts only the key of its hierarchical mother and then the confirmation chain runs up the hierarchy and down again to the corresponding bank. A disadvantage of this solution is that there has to be a clearly defined hierarchy, which is not possible in the field of tolls. Such a central key management function is not acceptable owing to the powerfulness of such a device.

SUMMARY OF THE INVENTION

An object of the present invention is to provide a communications system for registering tolls that permits tolls to be registered for a vehicle in a toll registration area that is not its home area, in a way which is comfortable and reliable.

The present invention provides a communications system for registering tolls, with vehicles which have communications devices for wirefree communication between the vehicles and the toll operator which is assigned to them and has a corresponding communications device, wherein the vehicles transmit toll information which is relevant to the toll operator in a toll-registration area which is assigned to the toll operator, and the toll operator determines or bills the toll to be charged therefrom. Means of their communication devices vehicles (F1) communicate with other toll operators (R1) outside the toll registration area of the toll operator (H) assigned to them in order to register tolls, wherein successful communication for the exchange of toll-related information takes place only when a certificate of the assigned toll operator (H) is successfully transmitted, and on the basis of a public key or a private key.

The communications system according to the invention makes it possible for, for example, a vehicle in a different toll registration area from the registration area of its toll operator to enter into contact directly or indirectly with the other toll operator, also referred to as roaming toll operator or roaming party. In this context, in order to ensure sufficiently secure information, communication is used both on the basis of a public key or private key and in addition on the basis of a certificate which has typically been negotiated between the two toll operators and whose subject matter is the fact that the transmitter of the certificate should be trusted as much as the generator of the certificate. This ensures, for example, that, owing to the agreement between the toll operators (vehicle's own toll operator and another toll operator/roaming party), the transmitter of the certificate is considered to be trustworthy and as a result, secure transmission and thus trust in the contents of the transmission is provided both on the basis of the certificate and of the public and/or private keys used and/or of symmetrical keys which are derived therefrom, even without any direct mutual agreement for the secure transmission of information.

In addition to the toll operators themselves it is possible for the various individual points of the toll systems to agree such certificates or comparable certificates bilaterally in a corresponding way without involving a central certification point, thus permitting secure communication between various subscribers of the toll systems by means of communication devices for wirefree communication. On the basis of this secure and trustworthy communication it is possible to implement toll-related information between vehicles and other points of other toll systems, for example control bridges, billing points and the like.

It has proven particularly appropriate to propose a communications system for registering, determining or billing tolls with a key management system in which all the parties or points of the toll systems are given equal priority. Any party can define its own secret key itself and when necessary agree mutual trust with a party to a contract (for example an adjacent toll operator) and the parties can issue corresponding certificates to one another. These certificates are transmitted in particular to the respective terminals, for example a vehicle device of one operator and a control system of the other operator, in particular off-line. In this context, in addition to the certificates, private and public keys which additionally secures the communication between the communicating parties are used. When such certificates are exchanged, which certificates function if appropriate, without acknowledgement to the issuing point, reliable securing processes can be carried out between unknown units without this exceeding an acceptable degree of expenditure.

In this context there is no need for a central "trust center" as a central certification point. Each toll operator in Europe, for example, would generate its own key in conjunction with appended certificates which the operator has agreed bilaterally with other parties and in this way configures its own vehicle units. In the case of roaming, that is to say in the situation in which a vehicle of one operator enters the registration area of another operator, the vehicle and also a control device of the toll system can then deal with these external devices/vehicles in a fraud-proof fashion.

If there is a new operator, all the vehicle devices, even those which are already configured, can also continue to operate in the new toll area in a fraud-proof fashion if corresponding certificates are agreed between the operators and are exchanged during the communication.

It has proven particularly appropriate that the transmission of a certificate is evaluated as successful if the transmitted certificate refers to a successfully certified communications party. As a result, it is possible to cause the trust in the communications system to be propagated or disseminated, which significantly reduces the expenditure on organizing the key administration. The expenditure on organization or transmission can be reduced additionally if the certificate and the public or private key are transmitted together in particular in an integrated fashion. This may be done without significantly adversely affecting the security.

The toll operators may basically be even companies which do not operate their own toll system but function as payment processors for toll payments to be paid. Such a company may be, for example, a bank which does not operate a toll system but carries out the processing of toll payments on the basis of contracts with roaming parties.

BRIEF DESCRIPTION OF THE DRAWING

The invention will be explained in more detail below by means of exemplary implementation. The invention is not restricted to this implementation. Further advantageous details can be found in this illustration. In the drawing.

DETAILED DESCRIPTION

Figure 1:
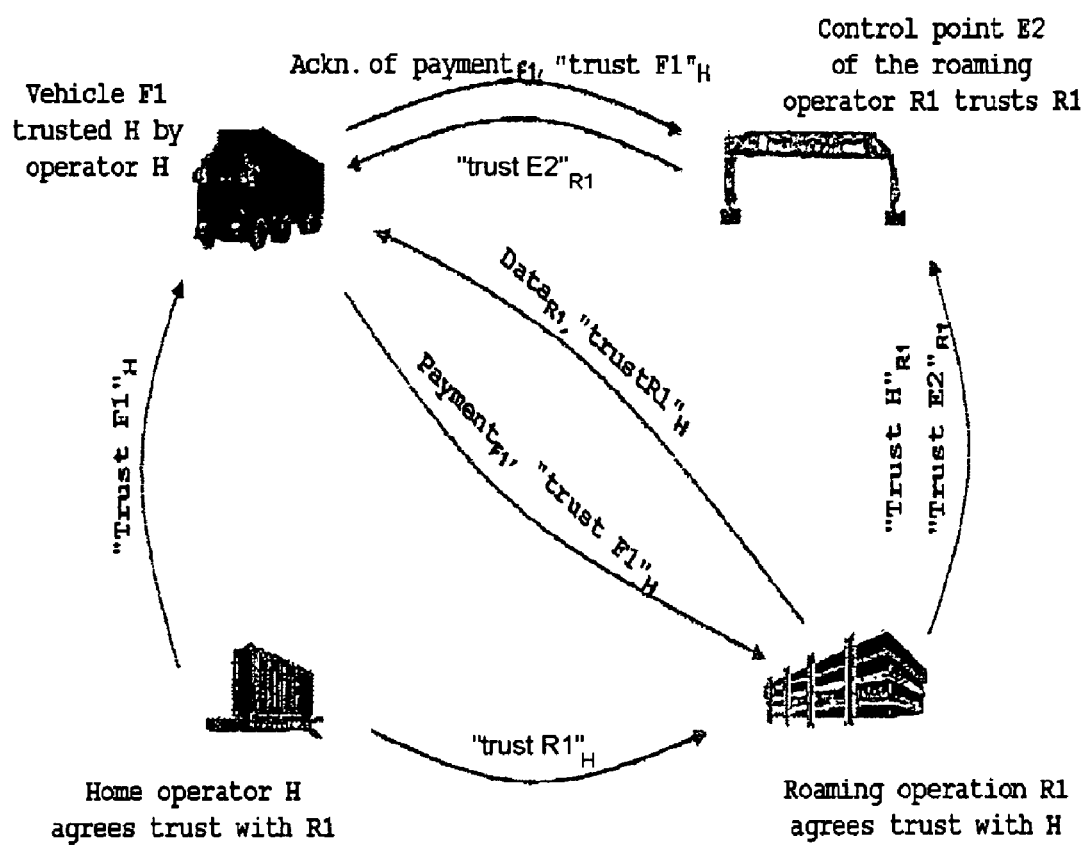
FIG. 1 shows a schematic structure of a toll system with a communications system according to the invention.

FIG. 1 is a graphic illustration of the relationships the interaction of various components or points of toll systems. These components or points of toll systems enter into contact with one another using a communications system according to the invention.

The following exemplary sequences occur:

The toll operator H configures a vehicle device F1 and gives it the public key of its home operator H (which is stored in a secured fashion) as well as a certificate which requests each addressee which also trusts the operator H to trust the public key of F1. This certificate is signed with the secret key of the operator H.

The home operator H also agrees mutual trust with its parties to a contract and in this context also transfers to its roaming party, another toll operator R1, a certificate which requests all the receivers which also trust the home operator H to trust R1.

If the vehicle then enters the region of the roaming party R1, it enquires there after toll-related data, for example after road data which is necessary for the decision to pay road tolls.

The roaming party R1 replies with a data record which it has signed with its secret key and transmits at the same time (or previously during a signing-on process) the certificate which was issued to it by the home operator H and which requests each receiver which also trusts H to trust it (R1).

The vehicle device which contains a communication device for wirefree communication can check the signature on the certificate since it knows the public key of H (secured) and thus trusts the data of the roaming party R1.

If the vehicle device detects a section to be paid from the data of the roaming party R1, a payment voucher is generated and signed with its own secret key. (In order to protect confidentiality this and possible other information additionally the data record with the public key of the receiver can be encrypted.) This signed payment record is sent to the operator R1 together with the certificate of the home operator which requests all parties to trust F1. Said operator R1 now trusts the signature from the certificate and the signature of the vehicle unit F1 and accepts the payment.

It can also submit this to its party H since as the result of the expression of the trust in F1 by the certificate H it must also trust this payment. A corresponding payment flow from H to R1 is thus secured.

If the vehicle F1 arrives at a control point E2 in the toll area of the roaming party R1, the control point E2 sends a certificate which it has received from its roaming party R1 in which all the receivers which also trust R1 are requested to trust E2.

The vehicle device already trusts R1 as a result of the certificate which it had acquired when the data was transmitted, and thus also trusts E2 as a valid control point.

The vehicle device thus transmits to this control point the acknowledgement of the payment which F1 itself had signed, and at the same time said vehicle device also sends its own certificate which H had issued, in which certificate all the receivers which also trust H are requested to trust F1.

In this context, E2 was already requested by its own control center of its own roaming party R1 to trust home operator H, which was agreed by the contract between the home operator H and the roaming party R1. As a result, the control point E2 already trusts the home operator H of the vehicle device, and as a result of an evaluation of its certificate E2 now also trusts the vehicle device F1, and thus the acknowledgement of payment.

This reliably permits billing of toll sums from another toll registration region by the home operator H, for example from the region of the roaming party R1, on the basis of the security which is provided. The toll registration regions may also overlap in this context.

This implementation provides a very secure and organizationally simple communication method and thus registration of tolls while avoiding the need for a central certification point.

The toll operators H may basically even be companies which do not operate their own toll system but function in this context as payment processors for toll payments to be paid. Such a company may be, for example, a bank which does not operate a toll system but carries out the toll payment processing on the basis of contracts with roaming parties.

What is claimed is:

1. A communications system for registering tolls, comprising
   a vehicle having a first communications device;
   a first toll operator assigned to the vehicle and having a second communications device for wirefree communications between the first and second communications devices, the toll operator being assigned to a toll-registration area; and
   a second toll operator outside of the toll-registration area, wherein, within the toll-registration area, the vehicle transmits toll information relevant to the first toll operator and the first toll operator determines or bills a toll to be charged from the toll information,
   and wherein, outside of the toll-registration area, the vehicle communicates with a second toll using the first communications device, a successful communication for the exchange of toll-related information with the second toll taking place only when a certificate of the first toll operator is successfully transmitted and on the basis of a public key or a private key.

2. The communications system for registering tolls as recited in claim 1, wherein the certificate is defined bilaterally between the first toll operator and one of the second toll operator, the vehicle, and a further point in the communications system for registering tolls.

3. The communications system for registering tolls as recited in claim 2, wherein the further point includes a toll control point.

4. The communications system for registering tolls as recited in claim 2, wherein the certificate was defined without a central certification point.

5. The communications system for registering tolls as recited in claim 1, wherein a transmission of the certificate is evaluated as successful if the transmitted certificate refers to a successfully certified communications party.

6. The communications system for registering tolls as recited in claim 1, wherein the certificate and the public or private key are transmitted together.

7. The communication system for registering tolls as recited in claim 1, wherein the first toll operator has a contract with the second toll operator.

8. A method for registering tolls using a communications system for registering tolls, the communications system comprising a vehicle having a first communications device; a first toll operator assigned to the vehicle and having a second communications device for wirefree communications between the first and second communications devices, the toll operator being assigned to a toll-registration area; and a second toll operator outside of the toll-registration area, wherein, within the toll-registration area, the vehicle transmits toll information relevant to the first toll operator and the first toll operator determines or bills a toll to be charged from the toll information, and wherein, outside of the toll-registration area, the vehicle communicates with a second toll using the first communications device, a successful communication for the exchange of toll-related information with the second toll taking place only when a certificate of the first toll operator is successfully transmitted and on the basis of a public key or a private key, the method comprising:

enquiring after toll related data from the second toll operation via the vehicle when the vehicle enters the region of the second toll operator;

replying to the vehicle via the second toll operator with a data record; and generating a payment voucher via the vehicle and sending the payment voucher to the second toll operator.

* * * * *